US012466053B2

(12) United States Patent
Chen

(10) Patent No.: US 12,466,053 B2
(45) Date of Patent: Nov. 11, 2025

(54) HAND TOOL WITH FUNCTION OF PREVENTING ELECTRIC SHOCK

(71) Applicant: INFAR INDUSTRIAL CO., LTD., Chang-Hwa (TW)

(72) Inventor: Tai-Hung Chen, Chang-Hwa (TW)

( * ) Notice: Subject to any disclaimer, the term of this patent is extended or adjusted under 35 U.S.C. 154(b) by 388 days.

(21) Appl. No.: 18/222,470

(22) Filed: Jul. 16, 2023

(65) Prior Publication Data

US 2024/0116167 A1 Apr. 11, 2024

(30) Foreign Application Priority Data

Oct. 11, 2022 (TW) .................................. 111138367

(51) Int. Cl.

| | |
|---|---|
| ***B25G 1/12*** | (2006.01) |
| ***B25B 13/06*** | (2006.01) |
| ***B25B 13/46*** | (2006.01) |
| ***B26B 3/00*** | (2006.01) |

(52) U.S. Cl.
CPC ................ *B25G 1/12* (2013.01); *B25B 13/06* (2013.01); *B25B 13/462* (2013.01); *B26B 3/00* (2013.01)

(58) Field of Classification Search
CPC .. B25G 1/12; B25G 3/34; B25G 1/125; B25B 13/06; B25B 13/065; B25B 13/08; B25B 13/462; B26B 3/00
See application file for complete search history.

(56) References Cited

U.S. PATENT DOCUMENTS 5,740,586 A * 4/1998 Gomas ..................... B25G 1/10 81/177.1
6,070,329 A * 6/2000 Gibbs ....................... B26B 3/00 30/340
7,434,318 B2 * 10/2008 Perez ...................... E04F 21/06 81/492
8,087,327 B2 * 1/2012 Lorbach .................. B26B 17/00 81/416
8,261,639 B2 * 9/2012 Liao ......................... B25G 1/01 81/436
8,746,114 B2 * 6/2014 Wu ....................... B25B 13/461 81/180.1
11,110,585 B2 * 9/2021 Lombardi ........... B29C 45/1676
2002/0033079 A1 * 3/2002 Zurbuchen ............... B25G 3/34 81/427.5
2008/0109998 A1 * 5/2008 Graff ........................ B25G 1/12 16/436
2012/0042754 A1 * 2/2012 Chen ..................... B25B 15/008 81/180.1

(Continued)

*Primary Examiner* — David B. Thomas
(74) *Attorney, Agent, or Firm* — Bruce Stone LLP; Joseph A. Bruce

(57) ABSTRACT

A hand tool with a function of preventing electronic shock includes a tool body, a basic insulation layer and a skidproof insulation layer. The basic insulation layer is formed on the tool body and has holes exposing a part of the tool body. The skidproof insulation layer is formed on the basic insulation layer to cover the holes. Annular protrusions are formed on the outer surface of the basic insulation layer or the inner surface of the skidproof insulation layer and are closer to edges of the basic insulation layer and the skidproof insulation layer than the holes. Therefore, it is possible to prevent electric shock caused by the seeping of moisture or liquid between the basic insulation layer and the skidproof insulation layer.

13 Claims, 8 Drawing Sheets

(56) References Cited

U.S. PATENT DOCUMENTS

| | | | | |
|---|---|---|---|---|
| 2013/0341069 | A1* | 12/2013 | Demaretz ................ | H02G 1/00<br>174/138 R |
| 2014/0053689 | A1* | 2/2014 | Lai ......................... | B25G 1/125<br>81/60 |
| 2020/0130165 | A1* | 4/2020 | Lombardi ............... | B25B 23/16 |
| 2024/0300085 | A1* | 9/2024 | Ezzo ........................ | B25G 3/34 |

* cited by examiner

HAND TOOL WITH FUNCTION OF PREVENTING ELECTRIC SHOCK

BACKGROUND

Field of the Invention

The present invention relates to a handle tool, and more particularly to a hand tool with function of preventing electric shock.

Description of Related Art

Existing hand tools, such as a socket wrench shown in FIGS. 1A to 1C, generally includes a plastic layer 200 coated on a gripping portion 100 of the tool body by injection molding. During the process of forming the plastic layer 200 on the gripping portion 100, it is necessary to clamp the gripping portion 100, which results in the plastic layer 200 formed on the gripping portion 100 having holes 210. Therefore, it is necessary to wrap a skidproof insulation layer 300 on the plastic layer 200 mentioned above to cover the holes 210.

However, due to the fact that the tool body is generally made of metal, and moisture or liquid can seep between the plastic layer 200 and the skidproof insulation layer 300 from the joint edge of the plastic layer 200 and the skidproof insulation layer 300, and even seep into the holes 210. Hence, even if the plastic layer 200 and the skidproof insulation layer 300 are made of insulated materials and the holes 210 are covered with the skidproof insulation layer 300, when the tool body comes into contact with a charged object, the leakage of electricity to the exposed gripping portion 100 through the holes will still be transmitted by the conductive medium formed by the moisture between the plastic layer 200 and the skidproof insulation layer 300 to the user who touches the joint edge of the plastic layer 200 and the skidproof insulation layer 300, causing the user to get an electric shock by the leakage of electricity.

SUMMARY

One objective of the present invention is to provide a hand tool with function of preventing electric shock, which can prevent moisture or liquid from seeping into the interior of the section of the hand tool where the user touches.

A hand tool with function of preventing electric shock in accordance with an embodiment of the invention includes: a tool body made of metal; a basic insulation layer formed on the tool body and including at least one hole and an outer surface far away from the tool body, wherein the at least one hole exposes a part of the tool body; and a skidproof insulation layer formed on the basic insulation layer to cover the at least one hole, and including an inner surface contacting the basic insulation layer. One of the outer surface of the basic insulation layer and the inner surface of the skidproof insulation layer is provided with at least one annular protrusion, and the at least one annular protrusion is closer to an edge of the basic insulation layer and an edge of the skidproof insulation layer than the at least one hole.

In one embodiment or other embodiments of the invention, the number of the at least one annular protrusion is plural, the annular protrusions include at least one front annular protrusion and at least one rear annular protrusion, and the at least one hole is located between the at least one front annular protrusion and the at least one rear annular protrusion.

In one embodiment or other embodiments of the invention, the number of the at least one annular protrusion is plural, the annular protrusions include at least one front annular protrusion and at least one rear annular protrusion, and the at least one hole is located between the at least one front annular protrusion and the at least one rear annular protrusion. Alternatively, the number of the at least one front annular protrusion is the same as the number of the at least one rear annular protrusion and is plural. Alternatively, the at least one front annular protrusion is separated from the at least one rear annular protrusion and they surround the tool body.

In one embodiment or other embodiments of the invention, the at least one hole is surrounded by the at least one annular protrusion. The number of the at least one annular protrusion is the same as that of the at least one hole.

In one embodiment or other embodiments of the invention, the at least one annular protrusion surrounds the tool body. Or, the holes are surrounded by at least one annular protrusion. Or, the number of the at least one hole is plural, and at least two of the holes are surrounded by the at least one annular protrusion. Or, the at least one annular protrusion and the at least one hole are located at a contact portion of the tool body, and the contact portion is a handle or a drive member.

In one embodiment or other embodiments of the invention, the other one of the outer surface of the basic insulation layer and the inner surface of the skidproof insulation layer is provided with at least one annular groove, the at least one annular groove accommodates and is shaped to fit the at least one annular protrusion, and the at least one annular groove is closer to the edge of the basic insulation layer and the edge of the skidproof insulation layer than the at least one hole.

In one embodiment or other embodiments of the invention, the number of the at least one annular protrusion is the same as the number of the at least one annular groove and is plural, the annular protrusions include at least one front annular protrusion and at least one rear annular protrusion, the annular grooves include at least one front annular groove and at least one rear annular groove, the at least one front annular protrusion accommodates and is shaped to fit the at least one front annular groove, the at least one rear annular protrusion accommodates and is shaped to fit the at least one rear annular groove, the at least one hole is located between the at least one front annular protrusion and the at least one rear annular protrusion and between the at least one front annular groove and the at least one rear annular groove.

In one embodiment or other embodiments of the invention, the number of the at least front annular protrusion is the same as the number of at least one front annular groove and is plural.

In one embodiment or other embodiments of the invention, the number of the at least rear annular protrusion is the same as the number of at least one rear annular groove and is plural.

In one embodiment or other embodiments of the invention, the at least one front annular protrusion is separated from the at least one rear annular protrusion and they surround the tool body, and the at least one front annular groove is separated from the at least one rear annular groove and they surround the tool body.

In one embodiment or other embodiments of the invention, the at least one annular protrusion and the at least one annular groove surround the tool body.

In one embodiment or other embodiments of the invention, the at least one hole is surrounded by the at least one annular protrusion and the at least one annular groove.

In one embodiment or other embodiments of the invention, the number of the at least one annular protrusion and the number of the at least one annular groove are the same as the number of the at least one hole.

In one embodiment or other embodiments of the invention, the number of the at least one hole is plural, and at least two of the holes are surrounded by the at least one annular protrusion and the at least one annular groove.

In one embodiment or other embodiments of the invention, the at least one annular protrusion and the at least one annular groove are located at a contact portion of the tool body, and the contact portion is a handle or a drive member.

By forming at least one annular protrusion on the outer surface of the basic insulation layer or the inner surface of the skidproof insulation layer, the hand tool provided by the invention can prevent moisture or liquid from seeping between the basic insulation layer and the skidproof insulation layer from the joint edge of the basic insulation layer and the skidproof insulation layer, so as to present the electricity leaked to the tool body exposed by the holes from being transmitted to the user who touching joint edge of the basic insulation layer and the skidproof insulation layer, causing the user to get an electric shock by the leakage of electricity.

BRIEF DESCRIPTION OF THE DRAWINGS

After studying the detailed description in conjunction with the following drawings, other aspects and advantages of the present invention will be discovered.

DETAILED DESCRIPTION

Before giving a detailed description, it should be noted that similar components are represented by the same number in the following description. The hand tool provided by the invention can provide anti-leakage function. The types of hand tools include but not limited to drivers, wrenches, pliers, hammers, chisels, saws or other types of hand tools. In order to clearly explain the spirit of the invention, examples of socket wrenches as hand tools are described below.

Figure 1A:
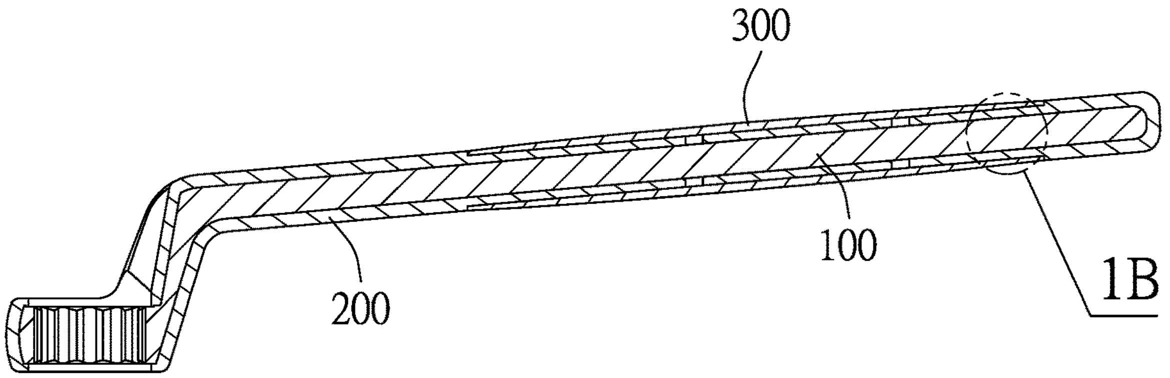
FIG.1A PRIOR ART
FIG. 1A is a cross-sectional view of a conventional socket wrench.
Figure 1B:
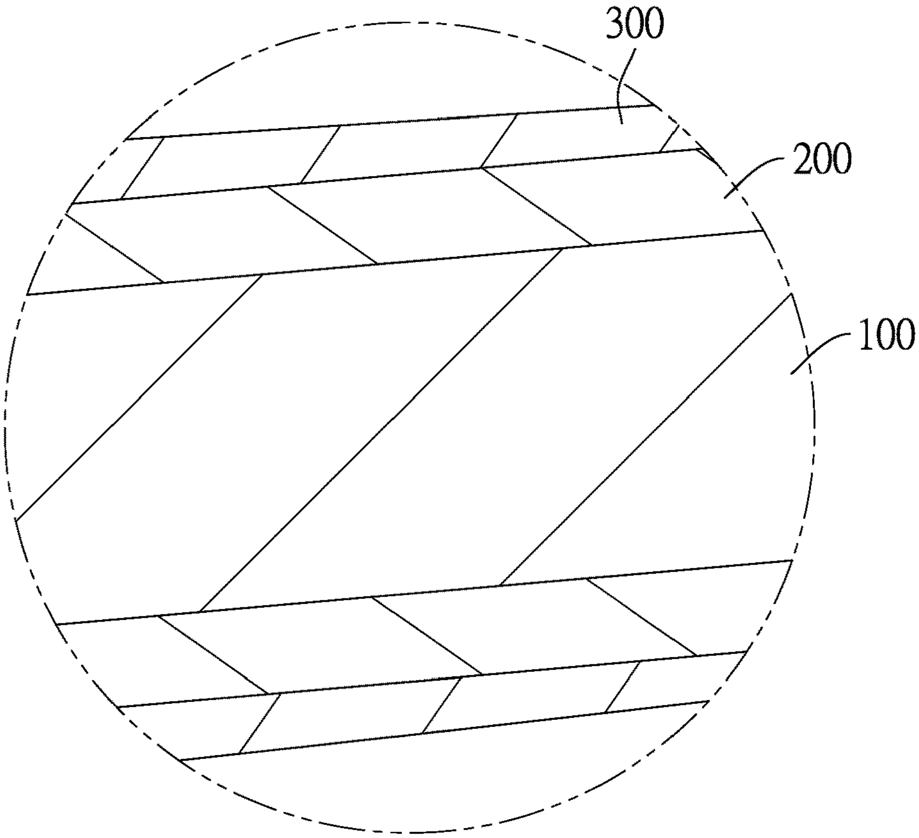
FIG.1B PRIOR ART
FIG. 1B is a magnified view of a part of FIG. 1A.
Figure 1C:
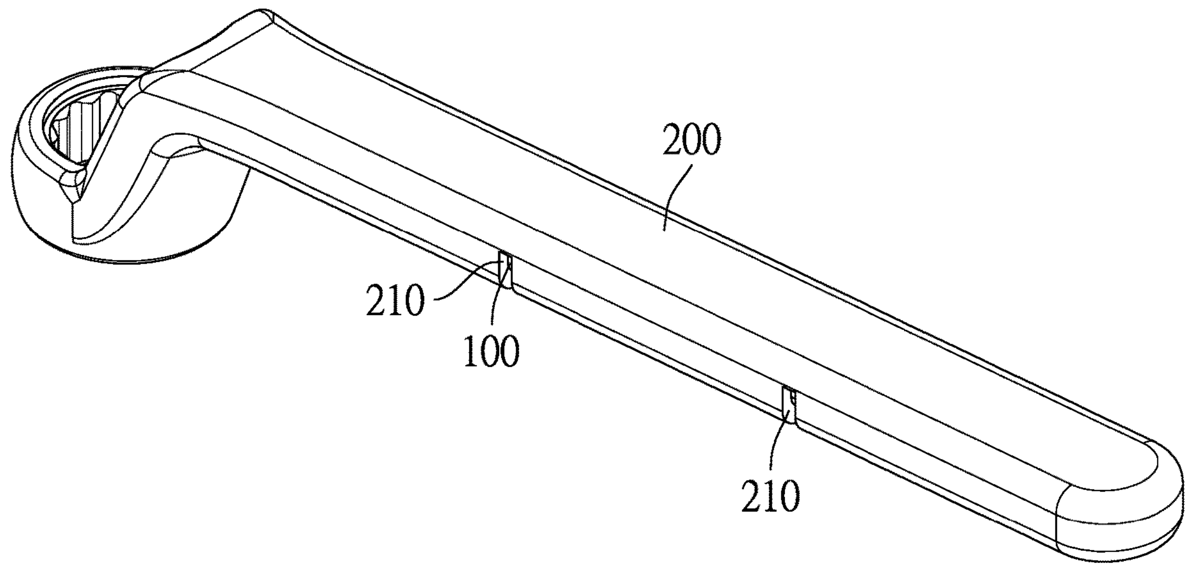
FIG.1C PRIOR ART
FIG. 1C is a schematic diagram of a conventional socket wrench before forming the skidproof layer.
Figure 2A:
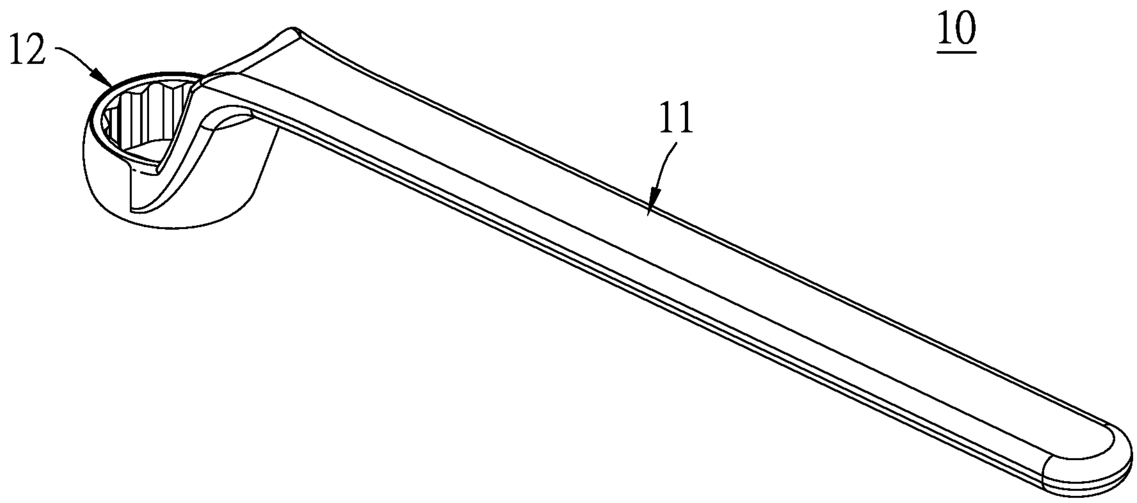
FIG. 2A is a schematic diagram of the steps of providing a tool body in the production process of a socket wrench according to an embodiment of the present invention.
Figure 2B:
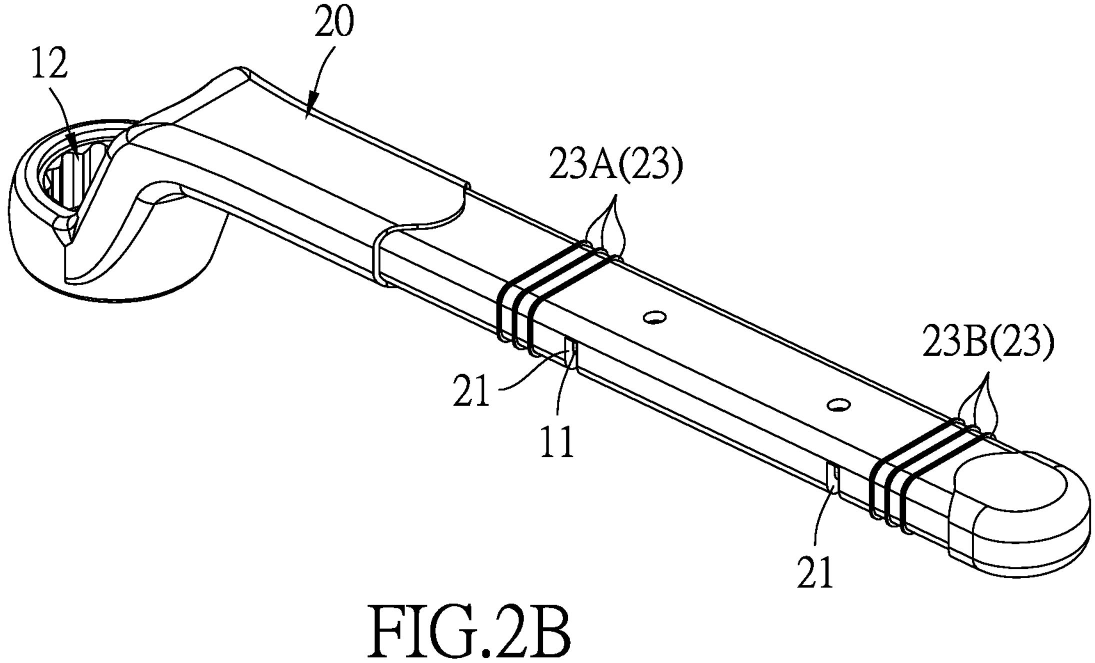
FIG. 2B is a schematic diagram of the steps of forming a basic insulation layer on the tool body in the production process of a socket wrench according to an embodiment of the present invention.
Figure 2C:
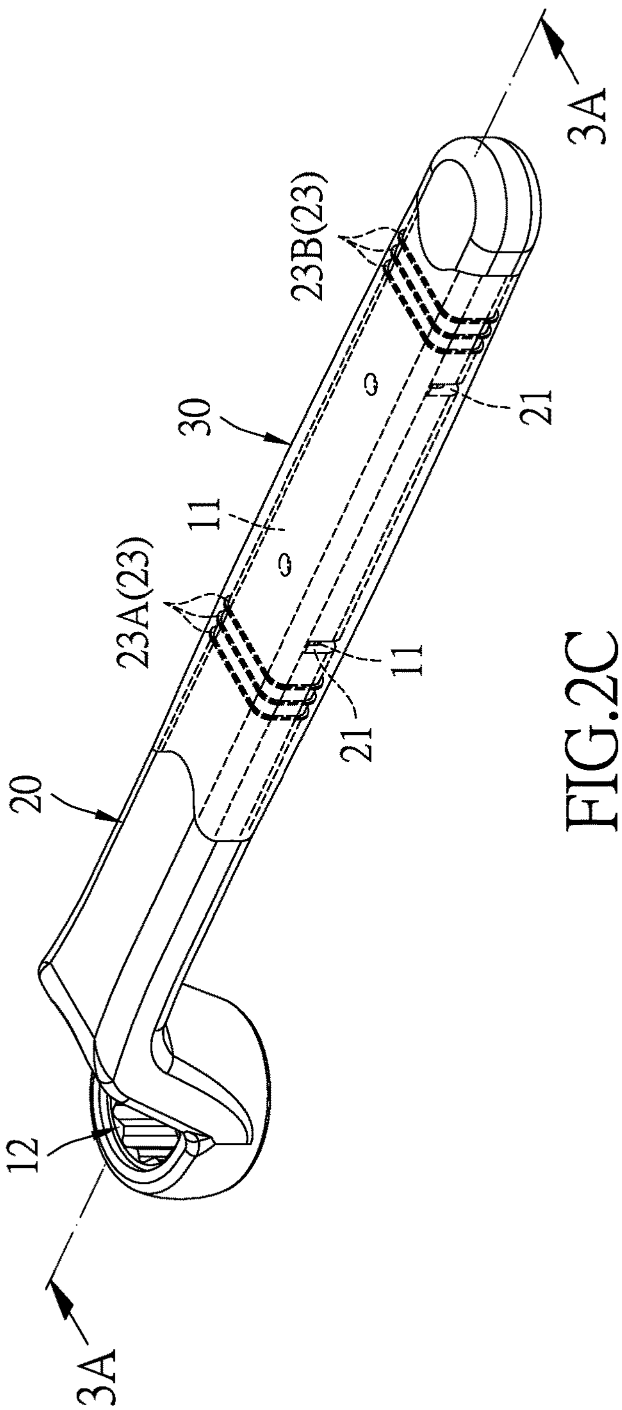
FIG. 2C is a schematic diagram of the steps of forming a skidproof insulation layer on the basic insulation layer in the production process of a socket wrench according to an embodiment of the present invention.
Figure 3A:
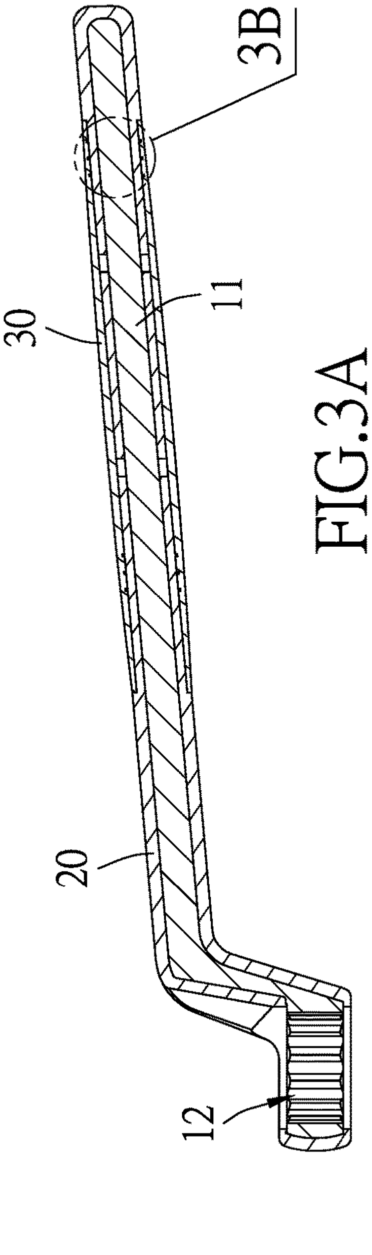
FIG. 3A is a cross-sectional view of FIG. 2B.
Figure 3B:
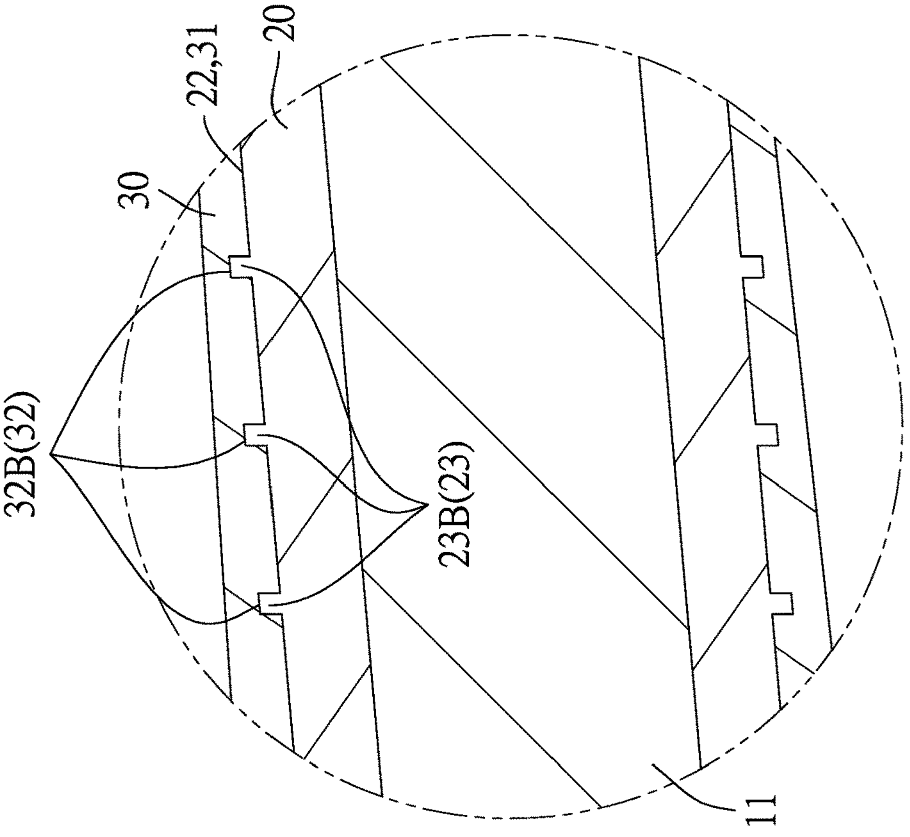
FIG. 3B is a magnified view of a part of FIG. 3A.

Please refer to FIG. 2A to FIG. 3, a socket wrench provided by the invention according to an embodiment includes a tool body 10, an basic insulation layer 20 and a skidproof insulation layer 30.

The tool body 10 is made of metal and includes a contact portion 11 and a working portion 12 connecting the contact portion 11. The contact portion 11 is a handle or drive member that can be touched, held or manipulated by the user. The working portion 12 is the part (such as the sleeve part) that can be driven by the contact portion 11 and move relative to an object (such as a nut).

The basic insulation layer 20 is made of plastic material, which is formed on the contact portion 11 through injection forming and includes a plurality of holes 21 and an outer surface 22 far away from the contact portion 11. Each hole 21 will expose a part of the contact portion 11. A plurality of annular protrusions 23 are arranged on the outer surface 22, and are closer to the edge of the basic insulation layer 20 and the edge of the skidproof insulation layer 30 than the holes 21. These annular protrusions 23 surround the contact portion 11 and include a plurality of front annular protrusions 23A and a plurality of rear annular protrusions 23B. These front annular protrusions 23A are closer to the working portion 12 than each rear annular protrusion 23B. These rear annular protrusions 23B are farther away from the working portion 12 than these front annular protrusions 23A. All the holes 21 are located between all the front annular protrusions 23A and all the rear annular protrusions 23B.

The skidproof insulation layer 30 is made of plastic material, which is formed on the basic insulation layer 20 to cover the holes 21, and includes an inner surface 31 that contacts the basic insulation layer 20. The inner surface 31 is provided with a plurality of annular grooves 32 which are closer to the edge of the basic insulation layer 20 and the edge of the skidproof insulation layer 30 than the holes 21. These annular grooves 32 include a plurality of front annular grooves (not shown in the figure, the front annular grooves are equivalent to rear annular grooves 32B) and a plurality of rear annular grooves 32B. The number of the front annular grooves is the same as that of the front annular protrusion 23A, and all the front annular grooves are 12 are closer to the working portion 12 than the rear annular grooves 32B. The front annular grooves separately accommodate and are shaped to fit the front annular protrusions 23A. The rear annular grooves 32B accommodate separately and are shaped to fit the rear annular protrusions 23B. The holes 21 are located between all the front annular grooves and all the rear annular grooves 32B.

In this embodiment, the hardness of the basic insulation layer 20 is greater than that of the skidproof insulation layer 30, but not limited to this, as long as the hardness of the basic insulation layer 20 is different from that of the skidproof insulation layer 30. In addition, the annular protrusion 23, which includes the front annular protrusion 23A and the rear annular protrusion 23B, is located on the harder basic insulation layer 20, but is not limited to this, and can also be located on the skidproof insulation layer 30. Besides, when the hardness of the skidproof insulation layer 30 is less than that of the basic insulation layer 20, it has the effect of skid proof and easy grip.

In this embodiment, the number of the front annular protrusions 23A is the same as the number of the rear annular protrusions 23B, but the invention is not limited to this. In other embodiments, the number of the front annular protrusions 23A may be changed to be different from the number of the rear annular protrusions 23B.

In this embodiment, the number of the front annular protrusions 23A is three, but the invention is not limited to this. In other embodiments, the number of the front annular protrusions 23A may be changed to one, two, or greater than three.

In this embodiment, the number of the rear annular protrusions 23B is three, but the invention is not limited to this. In other embodiments, the number of the rear annular protrusions 23B may be changed to one, two, or greater than three.

In this embodiment, all the front annular protrusions 23A are arranged at fixed intervals, but the invention is not limited to this. In other embodiments, all the front annular protrusions 23A may instead be arranged at unfixed intervals.

In this embodiment, all the rear annular protrusions 23B are arranged at fixed intervals, but the invention is not limited to this. In other embodiments all the rear annular protrusions 23B may instead be arranged at unfixed intervals.

In this embodiment, the number of the front annular grooves is the same as the number of the rear annular grooves 32B, but the invention is not limited to this. In other embodiments, the number of the front annular grooves may be changed to be different from the number of the rear annular grooves 32B.

In this embodiment, the number of the front annular grooves is three, but the invention is not limited to this. In other embodiments, the number of the front annular grooves may be changed to one, two, or greater than three.

In this embodiment, the number of the rear annular grooves 32B is three, but the invention is not limited to this. In other embodiments, the number of the rear annular grooves 32B may be changed to one, two, or greater than three.

In this embodiment, all the front annular grooves are arranged at fixed intervals, but the invention is not limited to this. In other embodiments, all the front annular grooves may instead be arranged at unfixed intervals.

In this embodiment, all the rear annular grooves 32B are arranged at fixed intervals, but the invention is not limited to this. In other embodiments, all the rear annular grooves 32B may instead be arranged at unfixed intervals.

In the present invention, at least one annular protrusion and its corresponding at least one annular groove may be converted to surround at least one hole. For example, each hole is surrounded by one annular protrusion and its corresponding annular groove; Or, each hole is surrounded by two or more annular protrusions and their corresponding two or more annular grooves; Alternatively, two or more holes are surrounded by one annular protrusion and its corresponding annular groove; Alternatively, two or more holes are surrounded by two or more annular protrusions and their corresponding two or more annular grooves.

Figure 4:
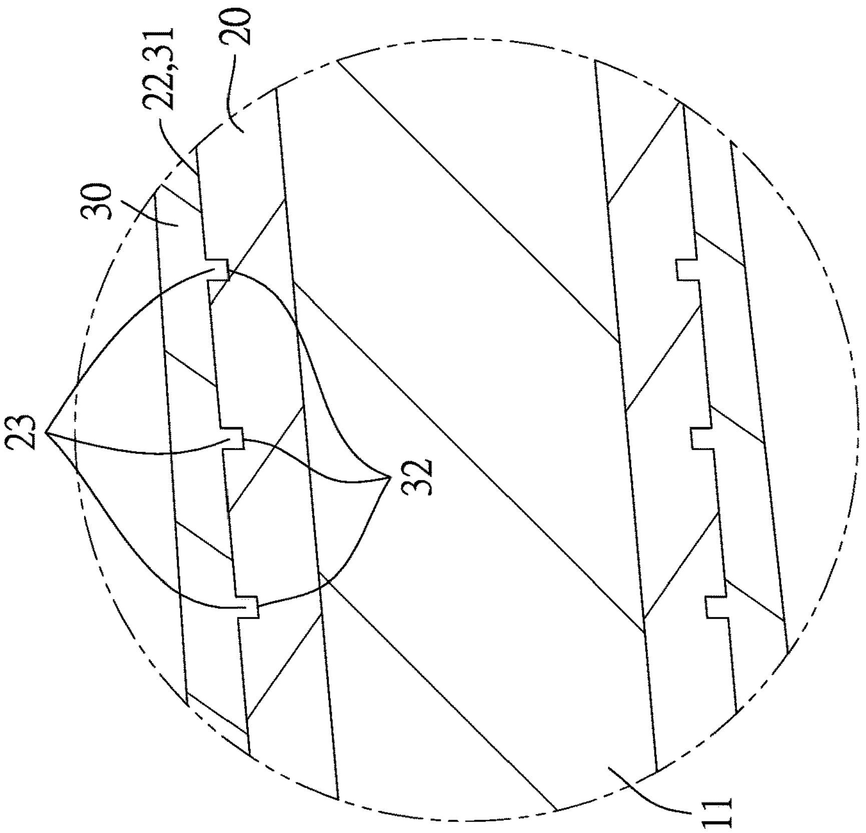
FIG. 4 is a schematic diagram of a part of the socket wrench according to an embodiment of the present invention.

In the present invention, as shown in FIG. 4, the annular protrusions 23 surrounding the contact portion 11 can be changed to be set on the inner surface 31 of the skidproof insulation layer 30, while the annular grooves 32 surrounding the contact portion 11 can be changed to be set on the outer surface 22 of the basic insulation layer 20. Similarly, at least one annular protrusion surrounding each hole can be changed to be arranged on the inner surface of the skidproof insulation layer, and the at least one annular groove surrounding each hole can be changed to be arranged on the outer surface of the basic insulation layer.

In the present invention, the annular protrusions and the annular grooves can also be disposed in other areas or parts of the tool body.

Figure 5:
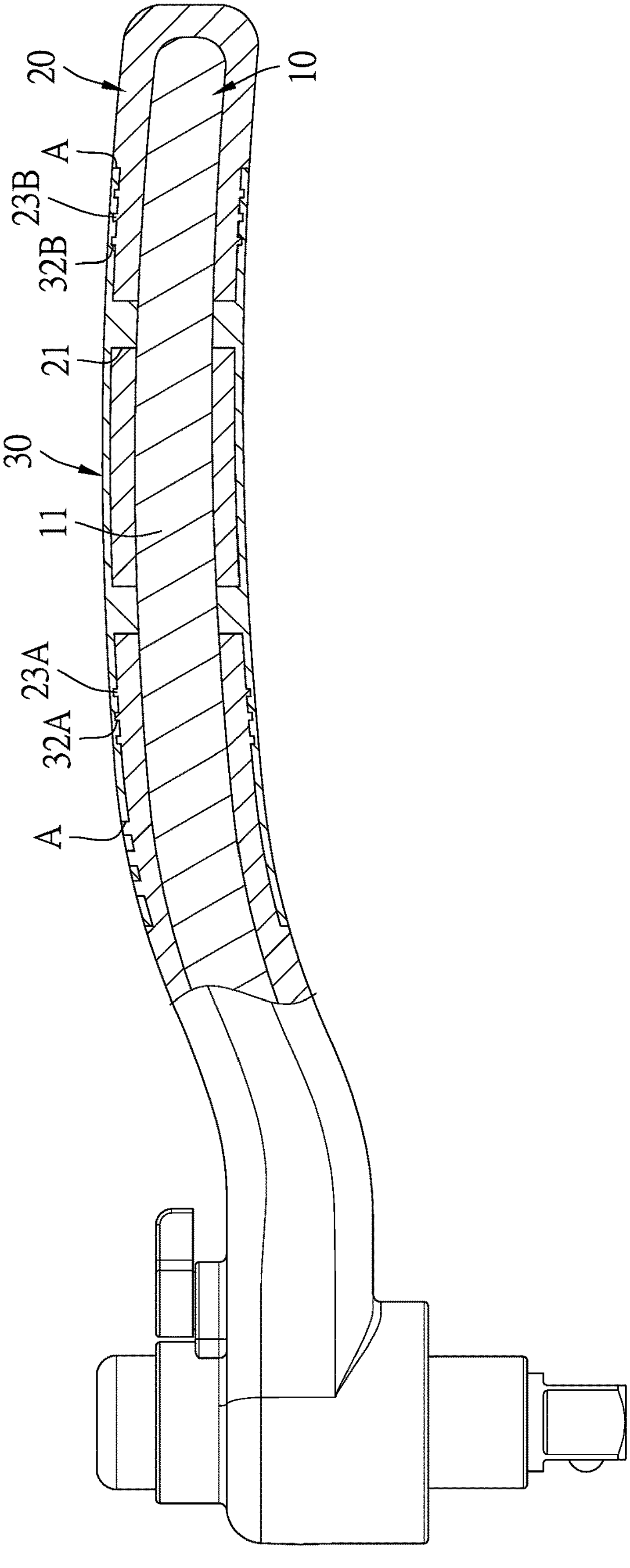
FIG. 5 is a schematic diagram showing that another embodiment of the present invention is a ratchet wrench.
Figure 6:
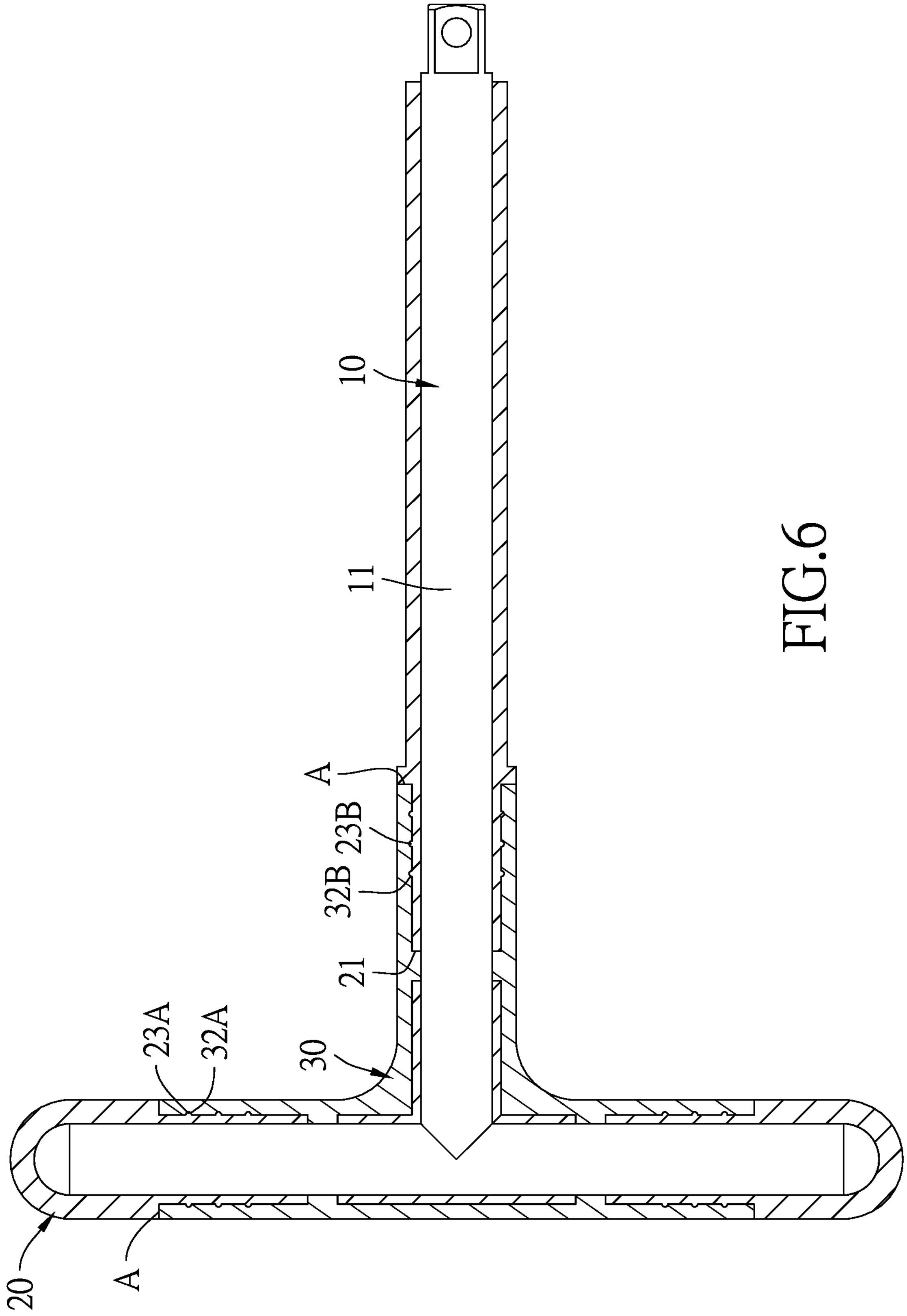
FIG. 6 is a schematic diagram showing that another embodiment of the present invention is a T-shaped wrench.
Figure 7:
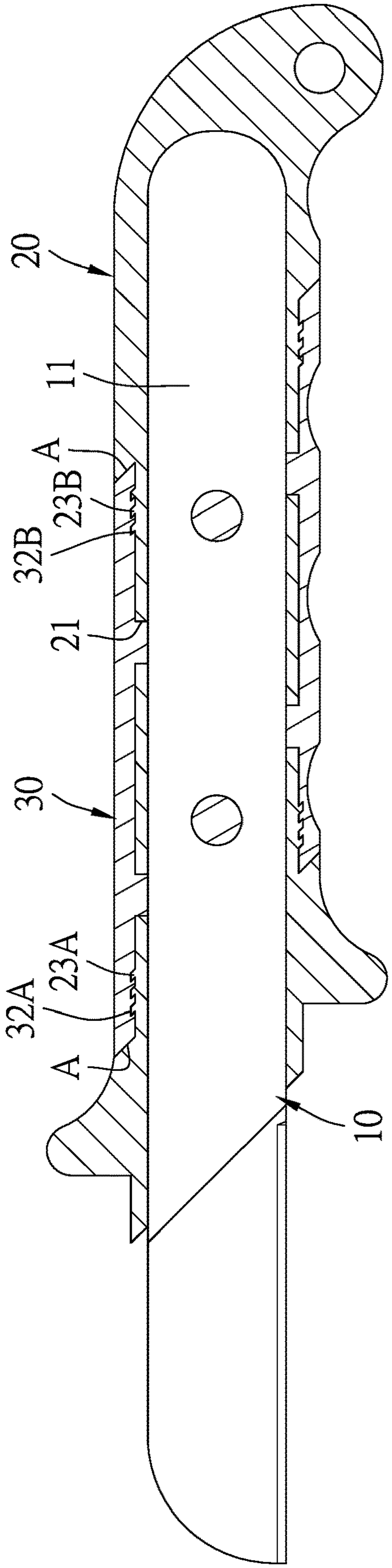
FIG. 7 is a schematic diagram showing that another embodiment of the present invention is a cutting cool.

In this embodiment, a hand tool with function of preventing electric shock provided by the present invention can be a ratchet wrench as shown in FIG. 5, and the contact portion 11 of the tool body 10 is generally curved. Or it can be a T-shaped wrench as shown in FIG. 6, the contact portion 11 of the tool body 10 is generally T-shaped, or it can be a tool as shown in FIG. 7, and the contact portion 11 of the tool body 10 is generally straight. Regardless of whether it is a ratchet wrench as shown in FIG. 5, or the T-shaped wrench as shown in FIG. 6 or the cutting tool as shown in FIG. 7, they are designed with the front annular protrusion 23A and the rear annular protrusion 23B of the basic insulation layer 20, respectively, matching with the front annular groove 32A and the rear annular groove 32B of the skidproof insulation layer 30. In other words, the hole 21 of the basic insulation layer 20 is separated from the joint edge A between the basic insulation layer 20 and the skidproof insulation layer 30 by the front annular protrusion 23A and rear annular protrusion 23B, as well as the matched front annular groove 32A and rear annular groove 32B, which can prevent moisture or liquid from seeping between the basic insulation layer 20 and the skidproof insulation layer 30 from the joint edge A between the basic insulation layer 20 and the skidproof insulation layer 30, thereby preventing electricity leakage to the tool body 10 exposed by the holes 21 from being transmitted to the joint edge A between the basic insulation layer 20 and the skidproof insulation layer 30, causing the user to get an electric shock by the leakage of electricity.

To sum up, by forming at least one annular protrusion on the outer surface of the basic insulation layer or the inner surface of the skidproof insulation layer, the hand tool provided by the invention can prevent moisture or liquid from seeping between the basic insulation layer and the skidproof insulation layer from the joint edge of the basic insulation layer and the skidproof insulation layer, so as to present the electricity leaked to the tool body exposed by the holes from being transmitted to the user who touching joint edge of the basic insulation layer and the skidproof insulation layer, causing the user to get an electric shock by the leakage of electricity.

Although the present invention is disclosed in the aforementioned embodiments, these embodiments are not intended to limit the present invention. Without departing from the spirit and scope of the present invention, all modifications, embellishments, and combinations of various embodiments are within the scope of patent protection of the present invention. Please refer to the attached claims for the protection scope defined in this invention.

What is claimed is:

1. A hand tool with function of preventing electric shock comprising:

a tool body made of metal;

a basic insulation layer formed on the tool body and including at least one hole and an outer surface far away from the tool body, wherein the at least one hole exposes a part of the tool body; and a skidproof insulation layer formed on the basic insulation layer to cover the at least one hole, and including an inner surface contacting the basic insulation layer;

wherein one of the outer surface of the basic insulation layer and the inner surface of the skidproof insulation layer is provided with at least one annular protrusion, and the at least one annular protrusion is closer to an edge of the skidproof insulation layer than the at least one hole.

2. The hand tool with function of preventing electric shock as claimed in claim 1, wherein the other one of the outer surface of the basic insulation layer and the inner surface of the skidproof insulation layer is provided with at least one annular groove, the at least one annular groove accommodates and is shaped to fit the at least one annular protrusion, and the at least one annular groove is closer to the edge of the basic insulation layer and the edge of the skidproof insulation layer than the at least one hole.

3. The hand tool with function of preventing electric shock as claimed in claim 2, wherein the number of the at least one annular protrusion is the same as the number of the at least one annular groove and is plural, the annular protrusions include at least one front annular protrusion and at least one rear annular protrusion, the annular grooves include at least one front annular groove and at least one rear annular groove, the at least one front annular protrusion accommodates and is shaped to fit the at least one front annular groove, the at least one rear annular protrusion accommodates and is shaped to fit the at least one rear annular groove, the at least one hole is located between the at least one front annular protrusion and the at least one rear annular protrusion and between the at least one front annular groove and the at least one rear annular groove.

4. The hand tool with function of preventing electric shock as claimed in claim 3, wherein the number of the at least front annular protrusion is the same as the number of at least one front annular groove and is plural, and the number of the at least rear annular protrusion is the same as the number of at least one rear annular groove and is plural.

5. The hand tool with function of preventing electric shock as claimed in claim 3, wherein the at least one front annular protrusion is separated from the at least one rear annular protrusion and they surround the tool body, and the at least one front annular groove is separated from the at least one rear annular groove and they surround the tool body.

6. The hand tool with function of preventing electric shock as claimed in claim 2, wherein the at least one annular protrusion and the at least one annular groove surround the tool body.

7. The hand tool with function of preventing electric shock as claimed in claim 2, wherein the at least one hole is surrounded by the at least one annular protrusion and the at least one annular groove.

8. The hand tool with function of preventing electric shock as claimed in claim 7, wherein the number of the at least one annular protrusion and the number of the at least one annular groove are the same as the number of the at least one hole.

9. The hand tool with function of preventing electric shock as claimed in claim 2, wherein the number of the at least one hole is plural, and at least two of the holes are surrounded by the at least one annular protrusion and the at least one annular groove.

10. The hand tool with function of preventing electric shock as claimed in claim 2, wherein the at least one annular protrusion and the at least one annular groove are located at a contact portion of the tool body, and the contact portion is a handle or a drive member.

11. The hand tool with function of preventing electric shock as claimed in claim 1, wherein a hardness of the basic insulation layer is different from that of the skidproof insulation layer.

12. The hand tool with function of preventing electric shock as claimed in claim 11, wherein the annular protrusion is located on the basic insulation layer which has a harder hardness or the skidproof insulation layer.

13. The hand tool with function of preventing electric shock as claimed in claim 12, wherein a hardness of the basic insulation layer is larger than that of the skidproof insulation layer.

* * * * *